United States Patent [19]

Black

[11] 4,318,204
[45] Mar. 9, 1982

[54] DISK WHEEL WITH BEARING HOUSING INJECTION MOLDED THEREIN

[75] Inventor: John W. Black, Hickory Corners, Mich.

[73] Assignee: Pemco-Kalamazoo, Inc., Kalamazoo, Mich.

[21] Appl. No.: 146,544

[22] Filed: May 2, 1980

[51] Int. Cl.³ ............................................. B60B 33/00
[52] U.S. Cl. ........................................................ 16/46
[58] Field of Search ........................... 2/46, 47, 48, 21; 308/187.1, 190

[56] References Cited

U.S. PATENT DOCUMENTS 3,957,147  5/1976  Specht ............................. 308/187.1
4,122,580  10/1978  Black ...................................... 16/46

*Primary Examiner*—Doris L. Troutman
*Attorney, Agent, or Firm*—Blanchard, Flynn, Thiel, Boutell & Tanis

[57] ABSTRACT

A wheel construction for a wheel primarily used in casters produced under high production conditions. The wheel has an axially extending hole therethrough which is lined with a moldable synthetic resin liner which is mechanically secured to the internal surface of the hole. The liner has axially spaced bearing race receiving structure at opposite ends thereof. An axle is received in the hole and bearings are positioned between the axle and the bearing race receiving structure on the liner to provide for a relative rotation between the axle and the wheel.

12 Claims, 5 Drawing Figures

DISK WHEEL WITH BEARING HOUSING INJECTION MOLDED THEREIN

FIELD OF THE INVENTION

The invention relates to a wheel construction and, more particularly, relates to a wheel having a hole in the central portion thereof which is lined with a moldable synthetic resin material, which liner includes bearing race receiving structure and structure for facilitating a mechanical connection of the liner to the internal surface of the hole.

BACKGROUND OF THE INVENTION

Although a variety of ball bearings and ball bearing assemblies have been devised in the past for meeting limitless situations where friction must be minimized, a constant effort is being made to improve the effectiveness of such bearing assemblies while simultaneously lowering their cost. This is of particular importance where the bearings are manufactured in large quantities for a variety of purposes, such as in caster wheels, conveyor wheels, small truck wheels and in wheels for other vehicles of generally similar nature. Where the production of such bearing assemblies is on the order of several hundred or more per hour, it is apparent that even a small reduction in the unit cost of a bearing assembly will result in greater savings, both to the manufacturer of the bearing assemblies and to the users thereof. On the other hand, in view of the critical part played by such bearing assemblies in practically all of their usual locations of use, it is equally apparent that such cost reductions, if any, must be made without sacrificing quality.

Bearings and the wheels associated therewith of this general nature have long been known and one such bearing is shown and described in U.S. Pat. No. 3,807,817, assigned to the same assignee as is the present invention. However, in a continuing effort to improve the quality of the product while at the same time reducing its cost, a great deal of effort has been made to detect points in the previous devices at which such improvements and/or cost reductions can be made. Thus, in such wheels and their bearing assemblies as shown in said patent, as well as in other generally similar patents, such as U.S. Pat. Nos. 4,072,373 and 4,122,580, both of which are assigned to the same assignee as is the present invention, there are shown axles for the support of the bearings which in turn support the wheels, which bearings are locked in position by the structure of the axle. This general feature has proven to be very durable in the field. However, it is important that the dimensional relationships between the axially spaced bearing races be maintained within prescribed limits. If the structure which holds the inner bearing race in fixed relationship to the axle is not carefully controlled, the wheel will be permitted to shift axially relative to the axle within the axial tolerance space provided between the inner bearing race and the outer bearing race. Heretofore, the bearings have provided a predesignated axial tolerance space so that there would exist a minimal amount of relative axial shifting movement between the axial and the wheel. It is accordingly desirable to eliminate the relative axial shifting movement between the axial and the wheel but such would not be possible without subjecting the bearing balls and bearing races to adversely high stress loads which could, in the long run, reduce the effective life of the bearings. It is desirable, therefore, to provide an effective means for limiting this relative axial movement while simultaneously further enhancing the life expectancy of the bearing construction.

Accordingly, the objects of the invention include:

1. To provide a bearing and wheel construction adaptable for use under high production conditions which will produce a very inexpensive wheel and yet one which will be solid, firm and capable of long and accurate operation.

2. To provide a bearing and wheel construction, as aforesaid, which will eliminate some of the manufacturing steps now required in certain present constructions of this type but will do so without sacrifice in quality of the resultant product.

3. To provide a bearing and wheel construction, as aforesaid, which will have other advantages and economies recognized by persons skilled in the art but which will at the same time provide a bearing capable of withstanding substantial abuse and requiring only minimal maintenance, such as is recognized as required for a variety of commercial applications, such as use in shopping carts.

4. To provide a bearing and wheel construction, as aforesaid, wherein the axial tolerance space between the inner and outer bearing races of each bearing construction is initially less than the diameter of the bearing balls that are to be inserted therebetween but providing elastically flexible structure for holding one of the bearing races in a position to define the preassembled axial tolerance space so that after the bearing balls are inserted between the bearing races, the resulting structure will cause an elastic urging of the bearing races into engagement with the bearing balls so that shock loads applied to the wheel will not be applied directly to the bearings but will be absorbed by the elasticity of the material engaging one of the bearing races.

SUMMARY OF THE INVENTION

The objects and purposes of the invention are met by providing a wheel construction having a wheel with an axially extending hole therethrough, which hole has a segment of larger diameter adjacent the axial ends thereof. An elastically deformable, moldable, synthetic resin liner is provided for lining the internal surface of the hole with means being provided integral therewith for effecting a mechanical securement of the liner in the larger diameter segments at the axial ends of the hole to prevent an axial movement of the liner relative to the wheel. The liner includes axially spaced bearing race receiving structure at opposite ends thereof. A pair of outer bearing races are located at the opposite axial ends of the liner and are received in the bearing race receiving structure. A cylindrical axle having a shoulder means at opposite axial ends thereof is disposed coaxially within and spaced from the liner. A pair of inner bearing races is provided on the axle and is oriented to be in radial alignment with the outer bearing races. Anti-friction members are provided between the respective pairs of the inner and outer bearing races.

Other purposes and advantages of the invention will be apparent to persons acquainted with apparatus of this general type upon reading the following specification and inspection of the accompanying drawings.

DETAILED DESCRIPTION

Figure 1:
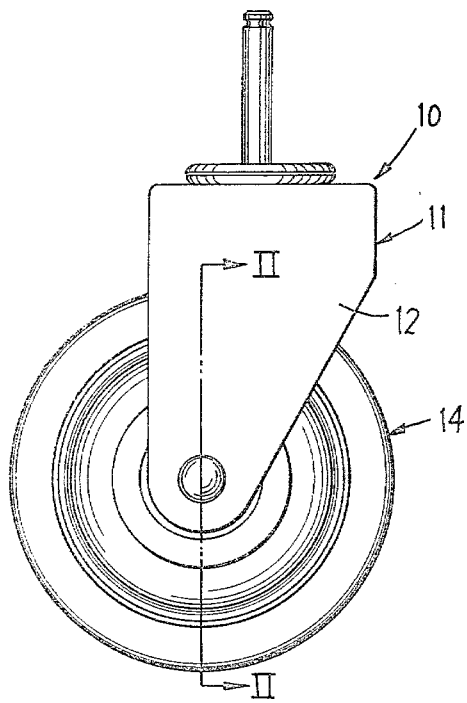
FIG. 1 is an elevational view of a wheel, here a caster wheel, embodying the invention.

FIG. 1 illustrates a swivel caster 10 which includes an inverted U-shaped frame 11 having a pair of parallel legs 12 and 13 straddling the wheel 14. The wheel also includes a bearing assembly 17 mounted in the central opening 16 of the wheel. An axle assembly 20 extends through the bearing assembly 17 and through a pair of axially aligned openings 18 and 19 in the legs 12 and 13, respectively.

The central opening 16 in the wheel 14 has a central wall segment 21, a pair of axially spaced and axially outwardly opening segments 22 and 23 of larger diameter and a pair of concentric annular grooves 24 and 26 opening axially outwardly away from each other and are located on the axially facing ends of the wheel adjacent the perimeter of the larger diameter segments 22 and 23, respectively. A liner 27 is fixedly secured to the internal surface of the central opening 16 by effecting a gripping of a pair of axially spaced and annular ribs 28 and 29 in the annular grooves 24 and 26, respectively. In order to effect this type of securement, the wheel 14 is placed into a mold having appropriate structure received in the central opening 16 thereof to facilitate the injection molding of the liner 27 on the internal surface of the central opening 16.

Figure 2:
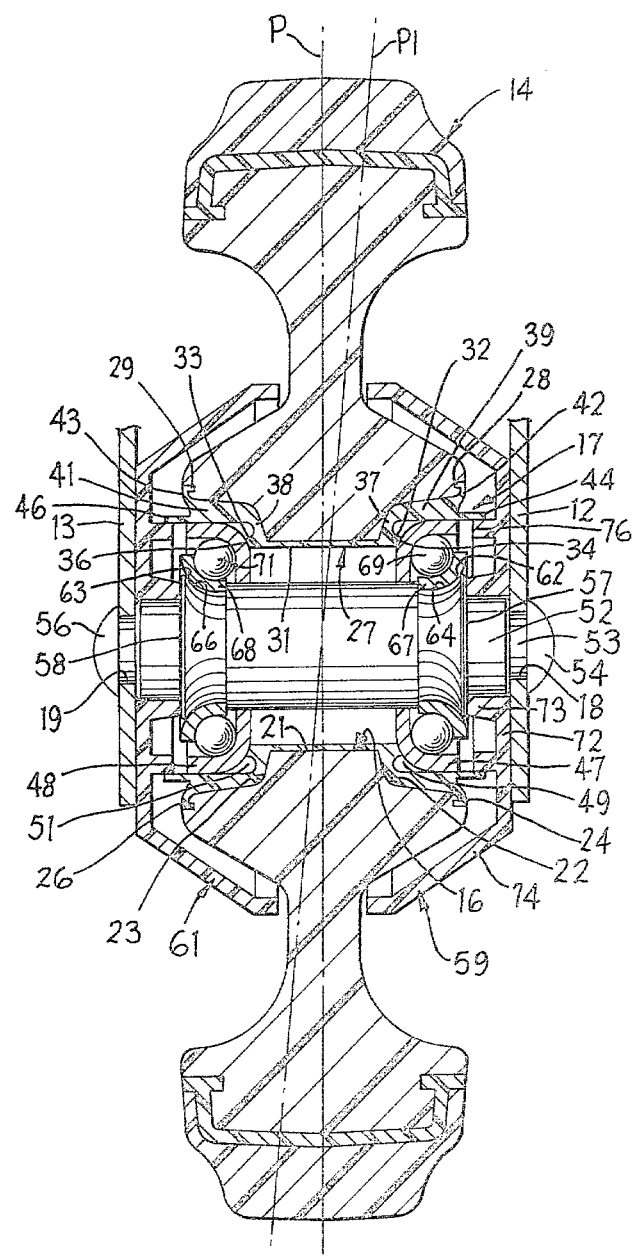
FIG. 2 is a central sectional view taken along the line II—II of FIG. 1.

More specifically, the liner has a central liner segment 31 lining the central wall segment 21 of the central opening 16. The structure illustrated in FIG. 2 is shown in an enlarged scale in the left side of FIG. 3. A pair of axially outwardly facing beads 32 and 33 is integrally secured to the axial ends of the central liner segment 31. The axial spacing between an arcuate surface 34 on the annular bead 32 and an arcuate surface 36 on the annular bead 33 is comparable to the dimension A illustrated in FIG. 5. The purpose of this particular construction will be explained in detail below.

The liner 27 additionally has a pair of radially outwardly extending wall segments 37 and 38 integrally connected to the annular beads 32 and 33, respectively. Each of the wall segments 37 and 38 is transformed into a relatively thick and elastic wall segment 39 and 41, respectively. The radially extending wall segments 37 and 38, as well as the corresponding wall segments 39 and 41, effect a lining of the larger diameter segments 22 and 23. Further radially outwardly extending wall segments 42 and 43 extend from the thick and elastic wall segments 39 and 41, respectively, which further radially extending wall segments 42 and 43 terminate in the aforesaid annular ribs 28 and 29, respectively. Axially extending cylindrical sleeve portions 44 and 46 extend axially away from the thick and elastic wall segments 39 and 41, respectively, toward the legs 12 and 13, respectively, of the frame 11.

Figure 3:
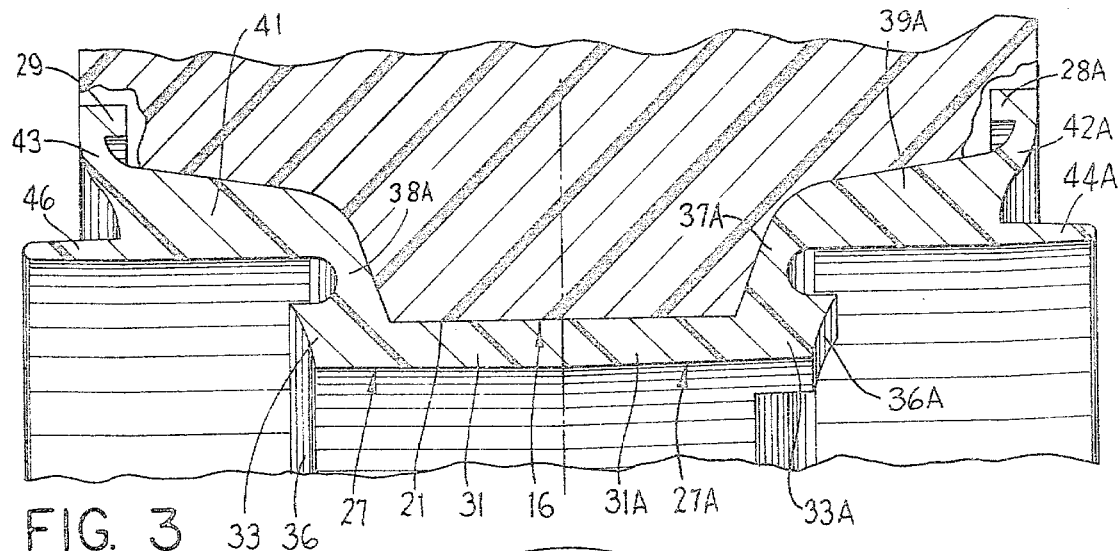
FIG. 3 is an enlarged fragmentary sectional view of two embodiments of a liner lining the internal surface of a central hole in a wheel, the left side being a first embodiment thereof and the right side being a second embodiment thereof.
Figure 4:
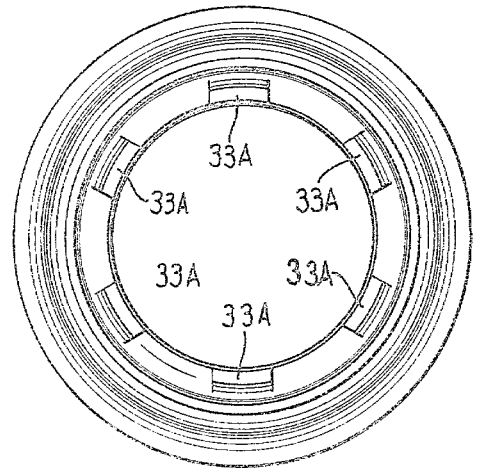
FIG. 4 is an end view of the embodiment on the right side of FIG. 3.

The right side of FIG. 3 illustrates a modified form of the liner 27A. For purposes of this discussion, the same reference numerals used to describe the structure on the left side of FIG. 3 will be used but with the suffix "A" added thereto. In this particular embodiment, the annular bead, corresponding to the aforedescribed annular bead 33, is a segmented bead comprising a plurality of circumferentially spaced bead segments 33A. Each of the beads segments 33A has an arcuate surface contour 36A facing in an axial outward direction. The arcuate spacing between the annular bead segments 33A is equal and is illustrated more clearly in FIG. 4. Since the remainder of the structure illustrated on the right side of FIG. 3 is the same as the structure illustrated on the left side thereof, further discussion is believed unnecessary.

A pair of axially spaced bearing races 47 and 48 is provided and each engages an axially facing arcuate surface 34 and 36, respectively, of the radially inwardly facing surface of the thick and elastic wall segments 39 and 41, respectively. In this particular embodiment, the bearing races 47 and 48 are outer bearing races. It is to be noted that an empty space 49 exists between the bearing race 47, the annular bead 32 and the radially inwardly facing surface of the thick and elastic wall segment 39. Similarly, a further empty space 51 exists between the outer bearing race 48, the annular bead 33 and the radially inwardly facing surface of the thick and elastic wall segment 41. The purpose of providing the empty spaces 49 and 51 will be explained in more detail below.

An axle 52 is provided and is coaxially located inside the liner 27. In this particular embodiment, the axle is hollow and is secured to the legs 12 and 13 of the frame 11 by a pin 53 having enlarged head segments on 54 and 56 on opposite ends thereof. The axle has shoulders 57 and 58 which locate a pair of end caps 59 and 61, further discussed hereinbelow, and the axle also has flanges 62 and 63 which define inner bearings races 64 and 66, respectively. The inner bearing races may, as here, be provided with anti-friction liners 67 and 68, respectively. A series of balls of which two are shown at 69 and 71, occupy in a conventional manner the space between the bearing races or, in this instance, the spaces between respectively facing surfaces of the race liners.

Turning now to the end caps 59 and 61, it will be seen that they are identical but are assembled facing oppositely from each other so as in FIG. 2 to appear as mirror images of each other. Turning first to the end cap 59, same is provided at its radially inner edge with a foot portion having a radial section 72 and an axial section 73. When in the installed position, the axial section 73 bears snugly against and is axially limited by the shoulder 57 while the radial section 72 bears snugly against and is supported by the peripheral surface of the axle 52 which is adjacent to the shoulder 57. The end cap then extends radially outwardly and axially away from the center of the bearing assembly to a central portion 74 which can bear against the inner surface of the leg 12 of the frame 11 as illustrated in FIG. 2 or be spaced slightly inwardly therefrom. The central portion 74 has an annular seal 76 extending axially centrally of the bearing assembly sufficiently to be in contact with the outwardly facing end of the cylindrical sleeve portion 44 of the liner 27. In this particular embodiment, the annular seal 76 and the cylindrical sleeve 44 are in telescoping relation to one another and are proportioned so that a tight seal will exist between these parts to prevent dust from entering into the opening containing the bearing assembly 17.

The leftward end of the wheel construction, including the end cap or dust cap 61, are all as seen in FIG. 2 mirror images of the parts above described in connection with the rightward side of FIG. 2 such that it will be evident upon inspection of the drawing in the light of the description already given for the rightward side of the device and hence no further description needs to be given with respect thereto.

ASSEMBLY

The assembly has been somewhat indicated above but will be reviewed to ensure a complete understanding of the invention.

As indicated above, the wheel 14 is placed into a mold so as to facilitate a lining of the internal surface of the central hole therein with the liner 27 or 27A. Thereafter, the bearing assembly 17 is installed in accordance with the teaching in my U.S. Pat. No. 3,807,817. The end caps or dust caps 59 and 61 are then assembled onto the ends of the axle 52 so that the axial sections abut against the shoulders 57 and 58. A relative axial movement may occur between the end caps 59 and 61 and the axle 52 but since the annular seal 76 and cylindrical sleeve 46 are in telescoping relation, the amount of axial movement will not cause a break of the seal between the annular seal 76 and the respective one of the cylindrical sleeve 44 and 46.

Figure 5:
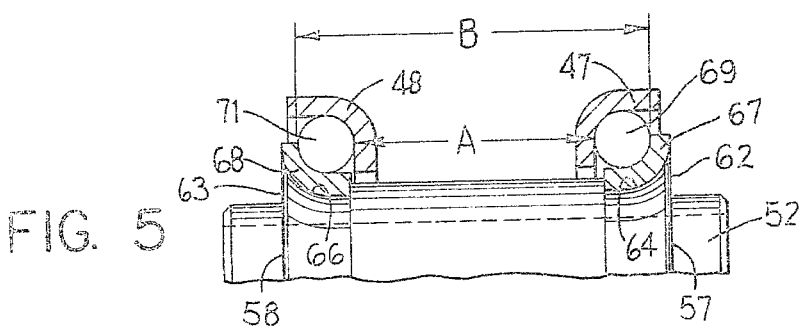
FIG. 5 is a diagrammatic representation of the bearing structure housed within the liner.

Referring now to FIG. 5, prior art bearing structures were assembled having a fixed dimension A and a variable dimension B. The variable dimension B was generated during the bearing assembly procedure and constituted normal tolerance variations during assembly. In this new bearing construction, the dimension B is still variable and the dimension A is an elastically variable dimension so as to facilitate an urging of the bearing races 47 and 48 into a snug but elastically yieldable relationship with the bearing balls 69 and 71. The elastic support for the outer bearing races 47 and 48 is provided by the annular beads 32 and 33. Since the axial spacing between the arcuate surfaces 34 and 36 in the relaxed uncompressed condition thereof is essentially equal to the dimension A illustrated in FIG. 5, the annular beads 32 and 33 must be slightly compressed during the assembly procedure because of the introduction of the outer bearing races 47 and 48 therein. The material that is deformed in the annular beads 32 and 33 will move into the heretofore empty spaces 49 and 51. Similarly, should the rotating plane P be shifted to a position inclined to the axis of rotation, such as the position P1 shown in FIG. 2, the material in the thick and elastic wall segments 39 and 41 will also be deformed into the empty spaces 49 and 51. The annular ribs 28 and 29 will keep the liner 27 connected to the wheel, particularly in the annular grooves 24 and 26. In addition, the material of the liner 27 is to be maintained in contact with the internal surface of the central opening 16. The annular ribs 28 and 29 will effectively prevent foreign material from entering the region between the wheel and the liner. Thus, shock loads applied to the wheel 14 will be absorbed by the material of the liner 27 and minimal shock loads will be applied to the bearing assembly 17.

The embodiment of the liner 27A illustrated on the right side of FIG. 3 can be used when it is desired to provide for a greater degree of elasticity in urging the outer bearing races 47 and 48 into a snug but elastically yieldable relationship with the balls 69 and 71. Similarly, the cylindrical sleeves 44 and 46 will also yield during a period of shock load applied to the wheel so as to maintain the seal with the annular seal 76.

The material of the liner is polyurethane having a hardness value in the range of 75 Shore A to 55 Shore D Durometer.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheel construction, comprising:
   wheel means having an axially extending hole therethrough and recess means adjacent the perimeter of the axial ends of said hole;
   elastically deformable, moldable, synthetic resin liner means lining the internal surface of said hole and including means integral therewith received in said recess means for effecting a mechanical locking connection of said liner means and to prevent an axial movement thereof relative to said wheel means, said liner means including axially spaced bearing race receiving means at opposite axial ends of said hole;
   a pair of outer bearing race means located at said opposite axial ends of said hole and received in said bearing race receiving means;
   a cylindrical axle having shoulder means at opposite axial ends thereof, said axle being disposed coaxially within and spaced from said liner means; and
   a pair of inner bearing race means on said axle and radially aligned with said outer bearing race means and anti-friction means positioned between respective pairs of said inner and outer bearing race means.

2. The wheel construction according to claim 1, wherein said shoulder means on said axle at axially spaced locations includes an axially spaced first shoulder on said axle limiting within normal tolerance limitations axial outward movement of said inner bearing race relative to said axle; and
   wherein said bearing race receiving means includes an elastically compressible second shoulder opposing said first shoulder and engaging said outer bearing race means, the axial spacing between said first and second shoulders, when said second shoulder is in the uncompressed condition, being less than the axial dimension of said inner and outer bearing race means with said anti-friction means disposed therebetween, whereby said second shoulder is elastically compressed when said inner and outer bearing race means and said anti-friction means are disposed between said first and second shoulders to effect an elastic compression of said anti-friction means between said inner and outer bearing race means and to thereby elastically restrict the relative axial movement between said wheel means and said axle.

3. The wheel construction according to claim 2, wherein said anti-friction means includes plural bearing balls, wherein said inner and outer bearing race means are annular metal stampings having oppositely facing arcuate cross sections between which are disposed said bearing balls, the cross sectional thickness of the respective ones of said metal stampings being uniform whereby the diameter of said bearing balls is determinative of the axial spacing between an uncompressed second shoulder and said first shoulder.

4. The wheel construction according to claim 2, wherein said inner bearing race means is disposed axially outside of said outer bearing race means.

5. The wheel construction according to claim 2, wherein said elastically compressible second shoulder comprises a continuous annular surface.

6. The wheel construction according to claim 2, wherein said elastically compressible second shoulder comprises plural coplanar arcuately spaced surface segments.

7. The wheel construction according to claim 5 or claim 6, wherein said surface of said second is shaped to conform to the shape of said bearing race means engaged therewith.

8. The wheel construction according to claim 1, wherein said liner means includes an integral, axially outwardly extending, flange extending beyond said axial ends of said hole, said flange having a first annular seal surface thereon; and wherein said wheel construction further comprises:
  frame legs and securement means for effecting an operative connection of said frame legs to said axle;
  a seal shoulder on said axle spaced axially outwardly from said first shoulder;
  a generally circular end cap made of a compressible thermoplastic material encircling said axle and having integral seal means bearing against said seal shoulder, said end cap having a portion thereof extending axially outwardly from said seal means to bear against the inner face of the axially adjacent frame leg and said end cap further having an integral second annular seal surface thereon bearing against said first annular seal surface, the parts being so proportioned that when said frame legs are in position adjacent the ends of said axle, said seal means on said end cap is urged snugly against said seal shoulder and said first and second annular seal surfaces urged into engagement with each other;
  whereby said frame legs are held firmly with respect to said axle and through said axle and said securement means held rigidly with respect to each other and said second annular seal surface of said compressible end cap is engaged with said first annular seal surface on said liner means for sealing said bearing means from dust.

9. The wheel construction according to claim 8, wherein said first annular seal surface faces radially and said second annular seal surface faces radially opposed to said first annular seal surface.

10. The wheel construction according to claim 1, wherein said wheel means includes a wheel, an annulus made of moldable, synthetic resin material and integral connecting means for mechanically coupling said annulus to said wheel around the periphery thereof and an annular tread made of moldable, synthetic resin material in close and intimate contact with said annulus and fusion bonding said tread and said annulus together thereby to firmly and securely lock said tread to said annulus.

11. A method for making a wheel having an axially extending hole therethrough and an axle and bearing means received in said hole for rotatably supporting said wheel relative to said axle, comprising the method steps of:
  placing said wheel into a mold having a central member received in said hole to define a space between the internal surface of said hole and the exterior surface of said central member; and
  injecting a moldable, synthetic resin material into said spacing and effecting a mechanical connection of said moldable, synthetic resin material, following a setting up thereof, to said internal surface to thereby line said internal surface with said moldable, synthetic resin material.

12. A method for making a wheel having an axially extending hole therethrough and an axle and bearing means received in said hole for rotatably supporting said wheel relative to said axle, comprising the method steps of:
  placing said wheel into a first mold having a first annular surface therein greater in diameter than the diameter of a first external surface of said wheel to define a first space therebetween;
  injecting a first moldable synthetic resin material into said first spacing and effecting a first mechanical connection of said moldable, synthetic resin material, following a setting up thereof, to said external surface of said wheel to thereby define an annulus;
  placing said wheel with said annulus thereon into a second mold having a second annuluar surface therein greater in diameter than the diameter of a second external surface on said annulus to define a second spacing therebetween;
  injecting a second moldable synthetic resin material into said second spacing and effecting a close and intimate contact with said annulus and fusion bonding said second resin material and said annulus together thereby firmly and securely locking said second resin material to said annulus, said second resin material forming a tread for said wheel construction;
  placing said wheel with said annulus and said tread fusion bonded to said annulus into a third mold having a central member received in said hole to thereby define a third space between the internal surface of said hole and a third external surface on said central member;
  injecting a third moldable, synthetic resin material into said third spacing and effecting a mechanical connection of said third moldable synthetic resin material, following a setting up thereof, to said internal surface to thereby define a liner lining said internal surface with said third moldable, synthetic resin material;
  inserting an axle into the center of a central opening now defined by the internal surface of said liner on the internal surface of said wheel and bearing means between said axle and said lining; and
  securing said axle and said bearing means in said central opening to facilitate a relative rotation between said axle and said wheel and against a relative axial movement therebetween.

* * * * *

UNITED STATES PATENT AND TRADEMARK OFFICE
CERTIFICATE OF CORRECTION

PATENT NO. : 4 318 204
DATED : March 9, 1982
INVENTOR(S) : John W. Black

It is certified that error appears in the above—identified patent and that said Letters Patent is hereby corrected as shown below:

Col. 1, line 63; change "axial" to ---axle---.

Col. 1, line 65; change "axial" to ---axle---.

Col. 7, line 16; after "second" insert ---shoulder---.

Signed and Sealed this

Fifteenth Day of June 1982

[SEAL]

Attest:

Attesting Officer

GERALD J. MOSSINGHOFF

Commissioner of Patents and Trademarks